(12) United States Patent
Matsumoto

(10) Patent No.: US 12,556,031 B2
(45) Date of Patent: Feb. 17, 2026

(54) UNINTERRUPTIBLE POWER SUPPLY DEVICE

(71) Applicant: TMEIC Corporation, Tokyo (JP)

(72) Inventor: Jun Matsumoto, Chuo-ku (JP)

(73) Assignee: TMEIC Corporation, Tokyo (JP)

( * ) Notice: Subject to any disclaimer, the term of this patent is extended or adjusted under 35 U.S.C. 154(b) by 0 days.

(21) Appl. No.: 18/836,475

(22) PCT Filed: Nov. 16, 2022

(86) PCT No.: PCT/JP2022/042534
§ 371 (c)(1),
(2) Date: Aug. 7, 2024

(87) PCT Pub. No.: WO2024/105806
PCT Pub. Date: May 23, 2024

(65) Prior Publication Data
US 2025/0105659 A1    Mar. 27, 2025

(51) Int. Cl.
*H01M 10/0525*    (2010.01)
*H01M 10/46*    (2006.01)
(Continued)

(52) U.S. Cl.
CPC ......... *H02J 9/062* (2013.01); *H01M 10/0525* (2013.01); *H01M 10/46* (2013.01);
(Continued)

(58) Field of Classification Search
CPC ...... H02J 9/062; H02J 7/0068; H02J 7/00712; H02J 2207/20; H02J 3/32; H02J 7/00;
(Continued)

(56) References Cited

U.S. PATENT DOCUMENTS

| | | | |
|---|---|---|---|
| 9,331,594 B2 * | 5/2016 | Gu | ........................ H02M 5/4585 |
| 2019/0181677 A1 | 6/2019 | Toyoda | |
| 2021/0135488 A1* | 5/2021 | Toyoda | .................. H02M 7/797 |

FOREIGN PATENT DOCUMENTS

| | | |
|---|---|---|
| EP | 2 845 831 A1 | 3/2015 |
| JP | 2001-253653 A | 9/2001 |

(Continued)

OTHER PUBLICATIONS

International Search Report Issued Jan. 24, 2023 in PCT/JP2022/042534, filed on Nov. 16, 2022, 2 pages.
(Continued)

*Primary Examiner* — Rexford N Barnie
*Assistant Examiner* — Xuan Ly
(74) *Attorney, Agent, or Firm* — Oblon, McClelland, Maier & Neustadt, L.L.P.

(57) ABSTRACT

A bidirectional chopper selectively performs: a charging operation to store DC power received from a DC bus in a power storage device; and a discharging operation to output DC power of the power storage device to the DC bus. An inverter converts the DC power received from the DC bus into AC power and supplies the AC power to a load, and converts regenerative power generated by the load into DC power and outputs the DC power to the DC bus. An SOC reference value is set for the power storage device, the SOC reference value being smaller than an upper limit value of a usable range of the SOC and larger than a lower limit value of the usable range. When an AC power supply is sound, a control device controls the bidirectional chopper such that the SOC of the power storage device reaches the SOC reference value.

12 Claims, 11 Drawing Sheets

(51) Int. Cl.
*H02J 7/00* (2006.01)
*H02J 9/06* (2006.01)

(52) U.S. Cl.
CPC ........ *H02J 7/0068* (2013.01); *H02J 7/00712* (2020.01); *H02J 2207/20* (2020.01)

(58) Field of Classification Search
CPC ...... H02J 9/06; H02J 7/0048; H01M 10/0525; H01M 10/46; Y02E 60/10; B66B 1/34; B66B 5/02; H02M 7/48
USPC .......................................................... 307/66
See application file for complete search history.

(56) References Cited

FOREIGN PATENT DOCUMENTS

| | | | |
|---|---|---|---|
| JP | 2001253653 | * | 9/2001 |
| JP | 2015-54729 A | | 3/2015 |
| JP | 2015054729 | * | 3/2015 |
| WO | WO 2017/179162 A1 | | 10/2017 |

OTHER PUBLICATIONS

English translation Written Opinion issued Jan. 24, 2023 in PCT/JP2022/042534, 3pgs.
Japanese Notice of Reasons for Refusal issued Jul. 16, 2024 in Japanese Application No. 2023-530988 with English translation, 8 pgs.

* cited by examiner

UNINTERRUPTIBLE POWER SUPPLY DEVICE

TECHNICAL FIELD

The present disclosure relates to an uninterruptible power supply device.

BACKGROUND ART

International Publication No. 2017/179162 (PTL 1) discloses an uninterruptible power supply device including: a converter that converts alternating-current (AC) power from an AC power supply into direct-current (DC) power and outputs the DC power to a DC bus; an inverter that converts the DC power received from the DC bus into AC power and supplies the AC power to a load; a first bidirectional chopper that transmits and receives DC power between the DC bus and a storage battery; and a second bidirectional chopper that transmits and receives DC power between the DC bus and a lithium ion battery.

In this uninterruptible power supply device, the storage battery is used as a battery that stores DC power used during a power failure of the AC power supply. The lithium ion battery is used as a battery that is charged and discharged each time the operation of the load is switched between a power running operation and a regenerative operation. The first bidirectional chopper is controlled such that the storage battery is charged when the AC power supply is sound and the storage battery is discharged during a power failure of the AC power supply. The second bidirectional chopper is controlled such that the lithium ion battery is charged while the load is performing a regenerative operation and the lithium ion battery is discharged while the load is performing a power running operation.

CITATION LIST

Patent Literature

PTL 1: International Publication No. 2017/179162

SUMMARY OF INVENTION

Technical Problem

In PTL 1, since the regenerative power generated in the load can be stored in the lithium ion battery, an increase in voltage on the DC bus can be suppressed without returning the regenerative power to the AC power supply when a power failure occurs in the AC power supply. Further, when the load is performing a power running operation, the regenerative power can be effectively utilized by discharging the lithium ion battery.

In PTL 1, however, it is necessary to prepare a battery (a storage battery) for compensating for a power failure and a battery (a lithium ion battery) for recovering regenerative power. Further, it is necessary to provide two bidirectional choppers respectively corresponding to these two batteries. Thus, there is a concern that the uninterruptible power supply device may be increased in size, weight, and cost. Further, there is also a concern that control of the uninterruptible power supply device according to the state of the AC power supply and the operation state of the load may become complicated.

The present disclosure has been made in order to solve the above-described problems, and an object of the present disclosure is to provide an uninterruptible power supply device capable of, in a simple configuration, suppressing an increase in voltage on a DC bus without returning regenerative power generated in a load to an AC power supply.

Solution to Problem

An uninterruptible power supply device according to an aspect of the present disclosure is connected between an AC power supply and a load. The uninterruptible power supply device includes a converter, a bidirectional chopper, an inverter, and a control device. The converter converts AC power from the AC power supply into DC power and outputs the DC power to a DC bus. The bidirectional chopper selectively performs: a charging operation to store the DC power received from the DC bus in a power storage device; and a discharging operation to output the DC power in the power storage device to the DC bus. The inverter converts the DC power received from the DC bus into AC power and supplies the AC power to the load, and converts regenerative power generated by the load into DC power and outputs the DC power to the DC bus. The control device controls the bidirectional chopper based on a state of charge (SOC) of the power storage device. An SOC reference value is set for the power storage device, the SOC reference value being smaller than an upper limit value of a usable range of the SOC and larger than a lower limit value of the usable range. When the AC power supply is sound, the control device controls the bidirectional chopper such that the SOC of the power storage device reaches the SOC reference value. When a power failure occurs in the AC power supply, based on the usable range, the control device controls the discharging operation in response to a power running operation of the load and controls the charging operation in response to a regenerative operation of the load.

Advantageous Effects of Invention

According to the present disclosure, it is possible to provide an uninterruptible power supply device capable of, in a simple configuration, suppressing an increase in voltage on a DC bus without returning regenerative power generated in a load to an AC power supply.

DESCRIPTION OF EMBODIMENTS

Figure 1:
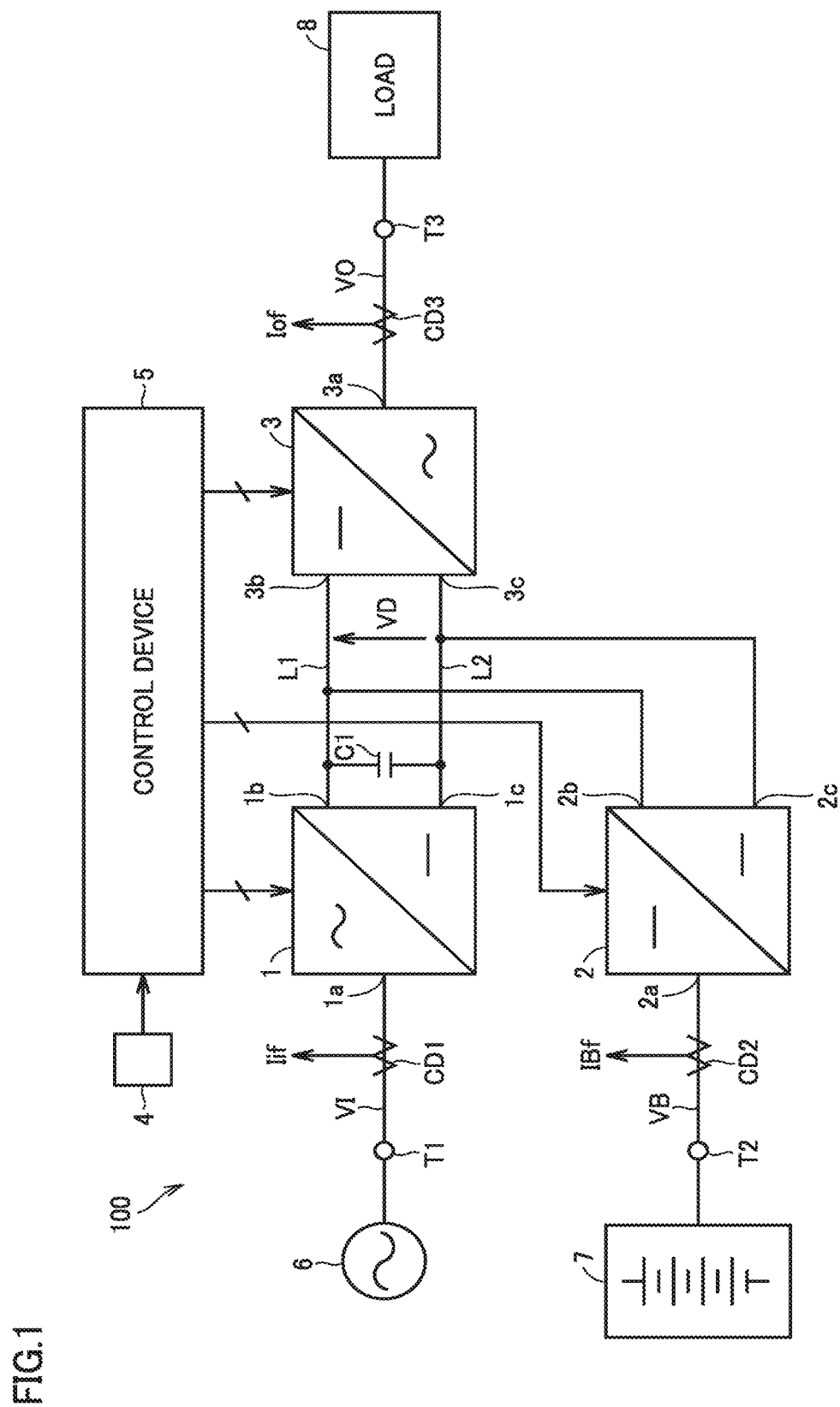
FIG. 1 is a circuit block diagram showing a configuration example of an uninterruptible power supply device according to an embodiment.

The following describes embodiments of the present disclosure in detail with reference to the accompanying drawings. In the following description, the same or corresponding portions in the figures are denoted by the same reference characters, and description thereof will not be basically repeated.

FIG. 1 is a circuit block diagram showing a configuration example of an uninterruptible power supply device according to the present embodiment. As shown in FIG. 1, an uninterruptible power supply device 100 is connected between a commercial AC power supply 6 and a load 8.

Load 8 is configured to perform: a power running operation in which load 8 is driven by AC power supplied from uninterruptible power supply device 100; and a regenerative operation in which regenerative power (AC power) is generated. Load 8 includes a motor, for example. When electric power is supplied to the motor as in the case when the motor is accelerated, load 8 performs a power running operation. On the other hand, when the motor is rotationally driven to operate as a power generator as in the case when the motor is decelerated, load 8 performs a regenerative operation. The regenerative power generated by load 8 is supplied to uninterruptible power supply device 100.

As shown in FIG. 1, uninterruptible power supply device 100 includes an input terminal T1, a DC terminal T2, an output terminal T3, a converter 1, current detectors CD1 to CD3, DC lines L1 and L2, a capacitor C1, a bidirectional chopper 2, an inverter 3, an operation unit 4, and a control device 5.

Input terminal T1 receives an AC voltage VI from commercial AC power supply 6. The instantaneous value of AC voltage VI is detected by control device 5. Based on the instantaneous value of AC voltage VI, it is determined, for example, whether a power failure occurs or not.

DC terminal T2 is connected to battery 7 (a power storage device). Battery 7 stores DC power. As battery 7, for example, a lithium ion battery is used. The instantaneous value of a DC voltage VB at DC terminal T2 (i.e., voltage VB across terminals of battery 7) is detected by control device 5.

Output terminal T3 is connected to load 8. Load 8 is driven by the AC power supplied from uninterruptible power supply device 100. The instantaneous value of an AC voltage VO appearing at output terminal T3 is detected by control device 5.

Although uninterruptible power supply device 100 receives three-phase AC voltages from commercial AC power supply 6 and supplies the three-phase AC voltages to load 8, FIG. 1 shows a circuit only for one phase for simplifying the illustration and the description.

Converter 1 includes an AC terminal 1a, a positive voltage terminal 1b, and a negative voltage terminal 1c. Bidirectional chopper 2 includes a DC terminal 2a, a positive voltage terminal 2b, and a negative voltage terminal 2c. Inverter 3 includes an AC terminal 3a, a positive voltage terminal 3b, and a negative voltage terminal 3c. AC terminal 1a of converter 1 is connected to input terminal T1. Current detector CD1 detects an instantaneous value of a current Ii flowing between input terminal T1 and AC terminal 1a, and supplies a signal Iif indicating the detected value to control device 5.

DC terminal 2a of bidirectional chopper 2 is connected to DC terminal T2. Current detector CD2 detects an instantaneous value of a DC current IB flowing between DC terminal T2 and DC terminal 2a, and supplies a signal IBf indicating the detected value to control device 5.

AC terminal 3a of inverter 3 is connected to output terminal T3. Current detector CD3 detects an instantaneous value of a current Io flowing between AC terminal 3a and output terminal T3, and supplies a signal Iof indicating the detected value to control device 5.

DC lines L1 and L2 have one terminals connected to positive voltage terminal 1b and negative voltage terminal 1c, respectively, of converter 1, and have the other terminals connected to positive voltage terminal 3b and negative voltage terminal 3c, respectively, of inverter 3. Further, DC lines L1 and L2 are connected to positive voltage terminal 2a and negative voltage terminal 2c, respectively, of bidirectional chopper 2. DC lines L1 and L2 each correspond to an example of a "DC bus".

Capacitor C1 is connected between DC lines L1 and L2, and stabilizes and smooths a DC voltage VD between DC lines L1 and L2. The instantaneous value of DC voltage VD is detected by control device 5.

Converter 1 is controlled by control device 5 such that, when converter 1 receives AC voltage VI from commercial AC power supply 6 in a sound manner (i.e., when commercial AC power supply 6 is sound) and when load 8 is performing a power running operation, converter 1 converts AC voltage VI supplied from commercial AC power supply 6 via input terminal T1 into DC voltage VD and outputs DC voltage VD between DC lines L1 and L2. When converter 1 does not receive AC voltage VI supplied from commercial AC power supply 6 in a sound manner (i.e., during a power failure of commercial AC power supply 6), the operation of converter 1 is stopped. When commercial AC power supply 6 is sound, control device 5 controls converter 1 such that DC voltage VD between DC lines L1 and L2 reaches a reference voltage VDR. During a power failure of commercial AC power supply 6, control device 5 stops the operation of converter 1.

Bidirectional chopper 2 is controlled by control device 5. When commercial AC power supply 6 is sound, bidirectional chopper 2 causes the DC power supplied from converter 1 through DC lines L1 and L2 to be stored in battery 7. When a power failure occurs in commercial AC power supply 6 and load 8 is performing a power running operation, bidirectional chopper 2 converts DC voltage VB of battery 7 into DC voltage VD and outputs DC voltage VD between positive voltage terminal 2b and negative voltage terminal 2c. When a power failure occurs in commercial AC power supply 6 and load 8 is performing a regenerative operation, bidirectional chopper 2 causes the DC power regenerated from inverter 3 through DC lines L1 and L2 to be stored in battery 7. Bidirectional chopper 2 is configured to be capable of selectively performing: a charging operation to store the DC power in battery 7; and a discharging operation to output the DC power of battery 7 between DC lines L1 and L2.

Control device 5 controls bidirectional chopper 2 such that DC voltage VB reaches a reference voltage VBR when commercial AC power supply 6 is sound. When a power failure occurs in commercial AC power supply 6 and load 8 is performing a power running operation, control device 5 controls bidirectional chopper 2 such that DC voltage VD reaches reference voltage VDR. When a power failure occurs in commercial AC power supply 6 and load 8 is performing a regenerative operation, control device 5 controls bidirectional chopper 2 such that DC voltage VB reaches reference voltage VBR.

Inverter 3 is controlled by control device 5. When commercial AC power supply 6 is sound and load 8 is performing a power running operation, inverter 3 converts DC voltage VD supplied from converter 1 through DC lines L1 and L2 into AC voltage VO and supplies the converted AC voltage VO to load 8. When commercial AC power supply 6 is sound and load 8 is performing a regenerative operation, inverter 3 converts AC voltage VO supplied from load 8 via output terminal T3 into DC voltage VD and outputs the converted DC voltage VD between DC lines L1 and L2.

When a power failure occurs in commercial AC power supply 6 and load 8 is performing a power running operation, inverter 3 converts DC voltage VD supplied from battery 7 through bidirectional chopper 2 and DC lines L1 and L2 into AC voltage VO and supplies the converted AC voltage VO to load 8. Output voltage VO of inverter 3 can be controlled to be set at a desired value. Control device 5 controls inverter 3 such that AC output voltage VO reaches a reference voltage VOR in a sine wave shape. When a power failure occurs in commercial AC power supply 6 and load 8 is performing a regenerative operation, inverter 3 converts AC voltage VO supplied from load 8 via output terminal T3 into DC voltage VD and outputs the converted DC voltage VD between DC lines L1 and L2.

Operation unit 4 includes a plurality of buttons operated by a user of the uninterruptible power supply device, an image display unit that displays various types of information, and the like. The user operates operation unit 4, and thereby, the power supply of the uninterruptible power supply device can be turned on and off, and various types of information can be set.

Control device 5 controls the entire uninterruptible power supply device based on AC voltage VI, AC current Ii, DC voltages VD and VB, DC current IB, AC voltage VO, AC current Io, signals from operation unit 4, and the like.

Figure 2:
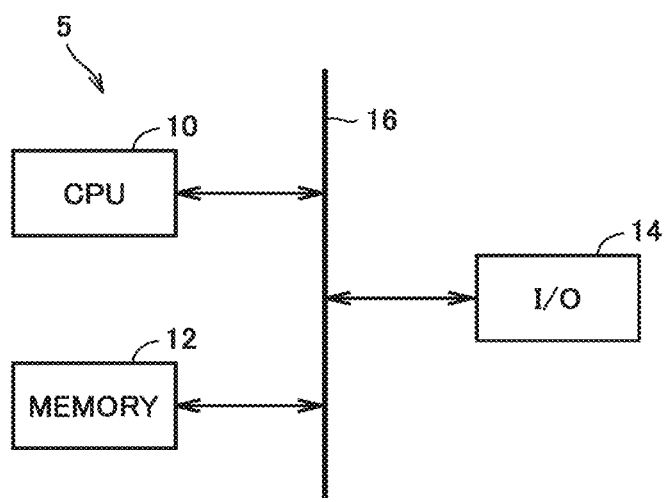
FIG. 2 is a block diagram showing a hardware configuration example of a control device.

FIG. 2 is a block diagram showing a hardware configuration example of control device 5. Typically, control device 5 can be configured by a microcomputer in which a predetermined program is stored in advance.

In the example in FIG. 2, control device 5 includes a central processing unit (CPU) 10, a memory 12, and an input/output (I/O) circuit 14. CPU 10, memory 12, and I/O circuit 14 can exchange data with each other through a bus 16. Memory 12 has a partial area in which a program is stored, and CPU 10 executes the program to make it possible to implement various functions described later. I/O circuit 14 inputs and outputs signals and data into and from the outside of control device 5.

Alternatively, unlike the example in FIG. 2, at least a part of control device 5 can be configured with a circuit such as a field programmable gate array (FPGA) or an application specific integrated circuit (ASIC). Further, at least a part of control device 5 can also be configured by an analog circuit.

Figure 3:
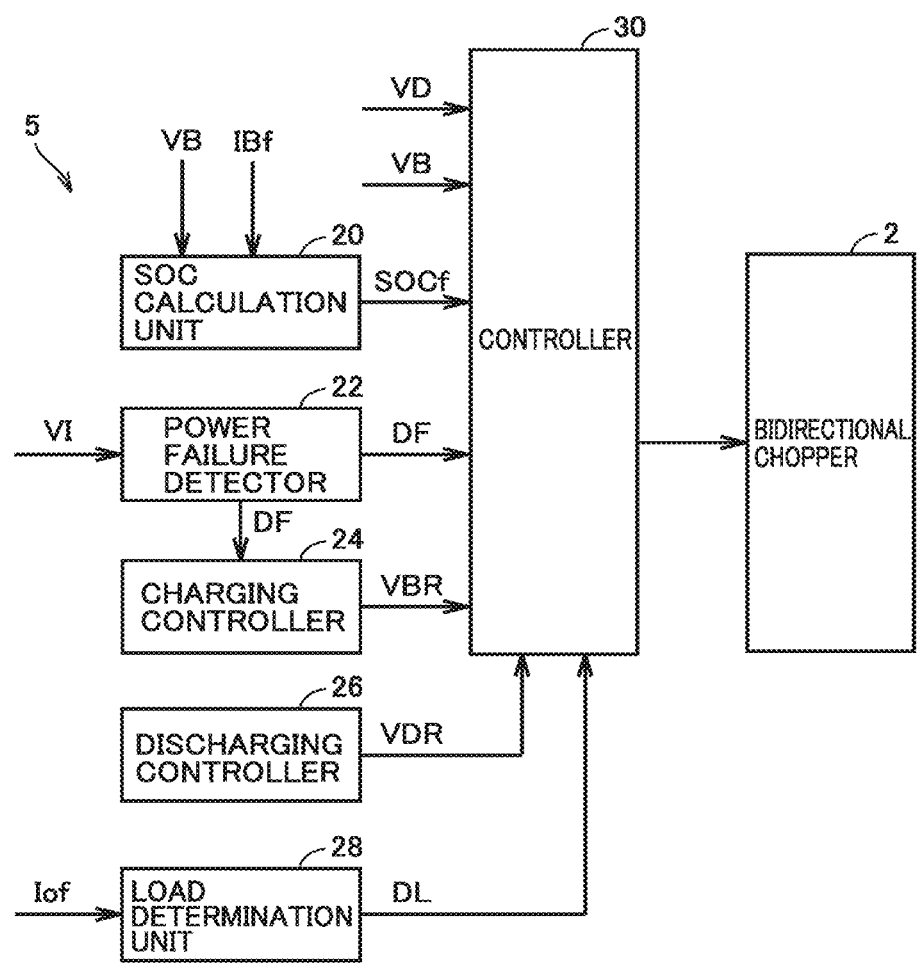
FIG. 3 is a block diagram showing a configuration of a part of the control device that relates to control of a bidirectional chopper.

FIG. 3 is a block diagram showing a configuration of a part of control device 5 that relates to control of bidirectional chopper 2. As shown in FIG. 3, control device 5 includes a state-of-charge (SOC) calculation unit 20, a power failure detector 22, a charging controller 24, a discharging controller 26, a load determination unit 28, and a controller 30. The functions of the blocks shown in FIG. 3 can be implemented by at least one of software processing and hardware processing by control device 5.

SOC calculation unit 20 calculates the SOC of battery 7 using the detected value of DC voltage VB (voltage VB across the terminals of battery 7) and/or the detected value of DC current IB. The SOC of battery 7 is a value indicating the amount of power storage in battery 7 and, for example, representing the present amount of power storage with respect to the full charge capacity of battery 7 in terms of percentage. The applicable method of calculating the SOC may include known methods such as a method using an integrated value of a direct current IBT, a method using an OCV (open circuit voltage)-SOC curve showing the relation between the OCV of battery 7 and the SOC. A signal SOCf indicating the calculated value of the SOC is given to controller 30.

Based on the detected value of AC voltage VI, power failure detector 22 detects whether or not a power failure occurs in commercial AC power supply 6, and then, outputs a signal DF indicating the detection result. Specifically, when AC voltage VI is within a predetermined normal range, power failure detector 22 determines that commercial AC power supply 6 is sound, and then, outputs signal DF of an L level. When AC voltage VI is lower than the normal range, power failure detector 22 determines that a power failure occurs in commercial AC power supply 6, and outputs signal DF of an H level. Output signal DF from power failure detector 22 is given to charging controller 24 and controller 30.

Figure 4:
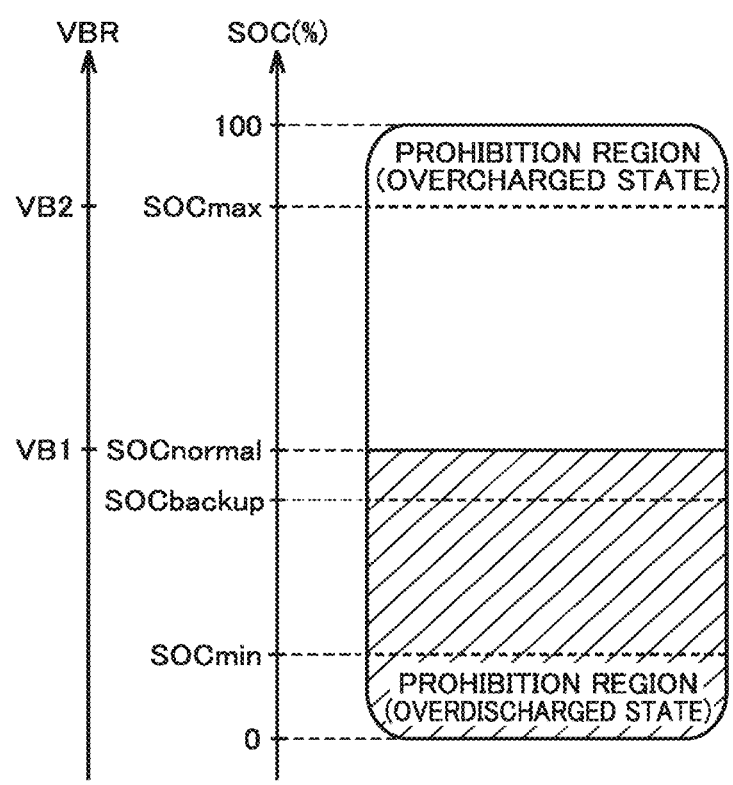
FIG. 4 is a diagram showing a relation between an SOC of a battery and a reference voltage VBR.

Charging controller 24 generates reference voltage VBR that is a target voltage of DC voltage VB (voltage VB across the terminals of battery 7). Specifically, charging controller 24 generates reference voltage VBR using output signal DF from power failure detector 22 and the OCV-SOC curve of battery 7. FIG. 4 is a diagram showing the relation between the SOC of battery 7 and reference voltage VBR.

As shown in FIG. 4, for the SOC of battery 7, determination values SOCmin, SOCnormal, and SOCmax are set as guides for controlling charging and discharging of battery 7. The condition SOC=0% corresponds to the idle state of battery 7, and the condition SOC=100% corresponds to the fully charged state of battery 7.

The SOC is set to include: a prohibition region in which charging of battery 7 is prohibited for preventing overcharging; and a prohibition region in which discharging of battery 7 is prohibited for preventing overdischarging. The usable range of the SOC includes an upper limit value SOCmax and a lower limit value SOCmin that are set based on these prohibition regions. Charging of battery 7 is prohibited when reaching the condition SOC>SOCmax, and discharging of battery 7 is prohibited when reaching the condition SOC<SOCmin.

SOCnormal is a determination value used to control charging and discharging of battery 7 when commercial AC power supply 6 is sound. SOCnormal is set to be larger than SOCmin and to be smaller than SOCmax. In the case where commercial AC power supply 6 is sound, charging of battery 7 is stopped when reaching the condition SOC>SOCnormal, and discharging of battery 7 is stopped when reaching the condition SOC<SOCnormal. In other words, when commercial AC power supply 6 is sound, charging and discharging of battery 7 are controlled such that the SOC is kept at SOCnormal. SOCnormal corresponds to one example of the "SOC reference value".

SOCnormal is set to be equal to or higher than SOCbackup. SOCbackup is an SOC for ensuring a function (a power failure compensation function) of uninterruptible power supply device 100 as a backup power supply used when a power failure occurs in commercial AC power supply 6. SOCbackup corresponds to the amount of power storage for power failure compensation. The amount of power storage for power failure compensation is an amount of power storage required for continuously supplying electric power from battery 7 to load 8 for a predetermined compensation time period in the case where a power failure occurs in commercial AC power supply 6. Thus, in order to ensure the power failure compensation function, the SOC needs to be kept equal to or higher than SOCbackup when commercial AC power supply 6 is sound.

As shown in FIG. 4, by setting the condition SOCnormal≥SOCbackup, the power failure compensation function of uninterruptible power supply device 100 can be ensured. On the other hand, if SOCnormal is set at a value close to SOCmax, there may be a problem that uninterruptible power supply device 100 cannot recover the regenerative power generated by load 8 when a power failure occurs in commercial AC power supply 6 and load 8 performs a regenerative operation.

Specifically, during a power failure of commercial AC power supply 6, the regenerative power output from inverter 3 between DC lines L1 and L2 cannot be supplied to commercial AC power supply 6 via converter 1. Thus, the regenerative power is stored in capacitor C1 connected between DC lines L1 and L2, and thereby, DC voltage VD rises. In order to prevent an overvoltage from occurring in capacitor C1 and thereby causing a failure, conventional uninterruptible power supply devices employ a method of providing a resistor that converts a regenerative current into heat. However, this method leads to a concern that the regenerative power may be wastefully discarded.

In uninterruptible power supply device 100 according to the present embodiment, when a power failure occurs in commercial AC power supply 6 and load 8 is performing a regenerative operation, bidirectional chopper 2 causes the DC power regenerated between DC lines L1 and L2 from inverter 3 to be stored in battery 7. Thus, an increase in DC voltage VD can be suppressed. Further, the regenerative power can be effectively utilized.

However, when the SOC of battery 7 is close to SOCmax during the regenerative operation of load 8, battery 7 cannot recover the DC power regenerated from load 8, with the result that DC voltage VD may rise.

As countermeasures against the above-mentioned problem, SOCnormal is set based on a maximum value Wmax of the amount of regenerative power generated in load 8. Maximum value Wmax of the amount of regenerative power is the maximum value of the amount of electric power estimated to be able to be regenerated when load 8 performs a regenerative operation. The data of maximum value Wmax of the amount of regenerative power can be obtained in advance by experiments or simulations and stored in memory 12 of control device 5.

SOCnormal is set such that SOCnormal, Wmax, and SOCmax satisfy the relation SOCnormal+Wmax≤SOCmax. This relation is intended to prevent the SOC of battery 7 from exceeding SOCmax due to the DC power regenerated from load 8, i.e., to prevent prohibition of charging of battery 7, even when load 8 performs only a regenerative operation during a power failure of commercial AC power supply 6. In the example in FIG. 4, the amount of power storage corresponding to the difference between SOCmax and SOCnormal corresponds to maximum value Wmax of the amount of regenerative power.

As described above, SOCnormal is set to satisfy the relation SOCmin<SOCbackup≤SOCnormal+Wmax≤SOCmax among SOCmin, SOCbackup, SOCmax, and Wmax. In other words, a battery having a battery capacity making it possible to satisfy the above-mentioned relation is applied as battery 7. When commercial AC power supply 6 is sound, battery 7 is not charged to upper limit value SOCmax of the usable range of the SOC, and thereby, progress of deterioration of battery 7 can be suppressed. Therefore, the life of battery 7 can be extended.

Charging controller 24 has two voltages VB1 and VB2 as reference voltage VBR. Voltage VB1 is set based on the OCV obtained when the SOC reaches SOCnormal in the OCV-SOC curve of battery 7. Voltage VB2 is set based on the OCV obtained when the SOC reaches SOCmax in the OCV-SOC curve of battery 7. Charging controller 24 sets reference voltage VBR at VB1 when output signal DF from power failure detector 22 is at an L level, i.e., when commercial AC power supply 6 is sound. When output signal DF from power failure detector 22 is at an H level, i.e., when a power failure occurs in commercial AC power supply 6, charging controller 24 sets reference voltage VBR at VB2.

Referring back to FIG. 3, discharging controller 26 generates reference voltage VDR as a target voltage of DC voltage VDC between DC lines L1 and L2. For example, discharging controller 26 generates reference voltage VDR based on the signal and the like from operation unit 4.

Based on the detected value of AC current Io detected by current detector CD3, load determination unit 28 determines whether load 8 is performing a power running operation or a regenerative operation. For example, load determination unit 28 performs three-phase to two-phase conversion (for example, d-q conversion) on three-phase AC currents Io obtained from output signal Iof of current detector CD3, to thereby obtain an active current and a reactive current. When the active current is a positive value (i.e., when the active current flows from inverter 3 to load 8), load determination unit 28 determines that load 8 is performing a power running operation. When the active current is a negative value (i.e., when the active current flows from load 8 to inverter 3), load determination unit 28 determines that load 8 is performing a regenerative operation. Load determination unit 28 outputs a signal DL indicating the determination result. When load 8 is performing a power running operation, signal DL is set at an H level. When load 8 is performing a regenerative operation, signal DL is set at an L level.

Controller 30 controls bidirectional chopper 2 based on signal SOCf from SOC calculation unit 20, signal DF from power failure detector 22, reference voltage VBR from charging controller 24, reference voltage VDR from discharging controller 26, signal DL from load determination unit 28, and DC voltages VB and VD, and the like.

When signal DF is at an L level and signal DL is at an H level (when commercial AC power supply 6 is sound and load 8 is performing a power running operation), controller 30 controls bidirectional chopper 2 such that DC voltage VB (voltage VB across the terminals of battery 7) reaches reference voltage VBR. In this case, reference voltage VBR=VB1.

When signal DF is at an L level and signal DL is at an L level (when commercial AC power supply 6 is sound and load 8 is performing a regenerative operation), controller 30 controls bidirectional chopper 2 such that DC voltage VB reaches reference voltage VBR. In this case, reference voltage VBR=VB1.

When signal DF is at an H level and signal DL is at an H level (when a power failure occurs in commercial AC power supply 6 and load 8 is performing a power running operation), controller 30 controls bidirectional chopper 2 such that DC voltage VD reaches reference voltage VDR.

When signal DF is at an H level and signal DL is at an L level (when a power failure occurs in commercial AC power supply 6 and load 8 is performing a regenerative operation), controller 30 controls bidirectional chopper 2 such that DC voltage VB reaches reference voltage VBR. In this case, reference voltage VBR=VB2.

Then, the operation of uninterruptible power supply device 100 will be described.

Figure 5:
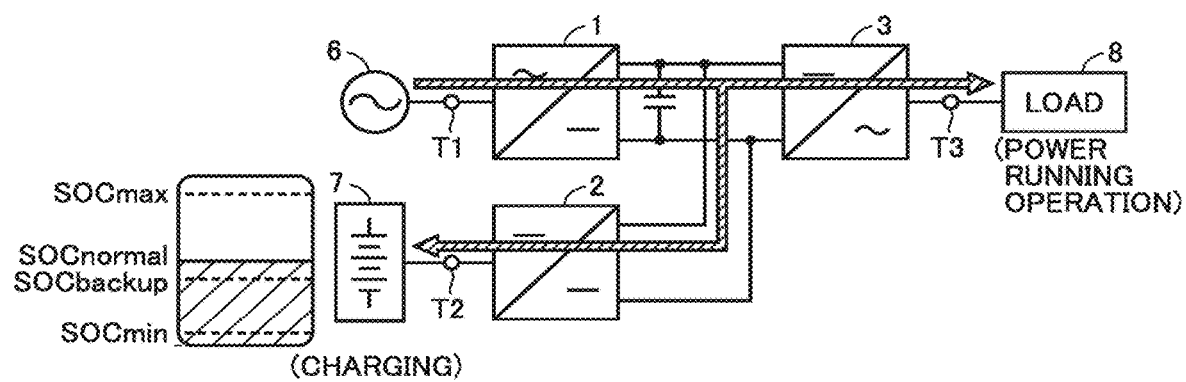
FIG. 5 is a diagram for illustrating an operation of the uninterruptible power supply device that is performed when a commercial AC power supply is sound and a load performs a power running operation.

FIG. 5 is a diagram for illustrating the operation of uninterruptible power supply device 100 that is performed when commercial AC power supply 6 is sound and load 8 performs a power running operation. Arrows in the figure indicate the flow of the electric power exchanged among commercial AC power supply 6, load 8, and battery 7.

As shown in FIG. 5, converter 1 converts AC power supplied from commercial AC power supply 6 into DC power, and then, outputs the converted DC power between DC lines L1 and L2. Inverter 3 converts the DC power supplied from converter 1 through DC lines L1 and L2 into AC power, and then, supplies the converted AC power to load 8.

Bidirectional chopper 2 causes the DC power supplied from converter 1 through DC lines L1 and L2 to be stored in battery 7. Control device 5 controls bidirectional chopper 2 such that DC voltage VB of battery 7 reaches reference voltage VBR (=VB1). Thereby, battery 7 is charged such that the SOC of battery 7 reaches SOCnormal. When reaching a condition SOC>SOCnormal, control device 5 stops the operation of bidirectional chopper 2 to thereby stop charging of battery 7.

Figure 6:
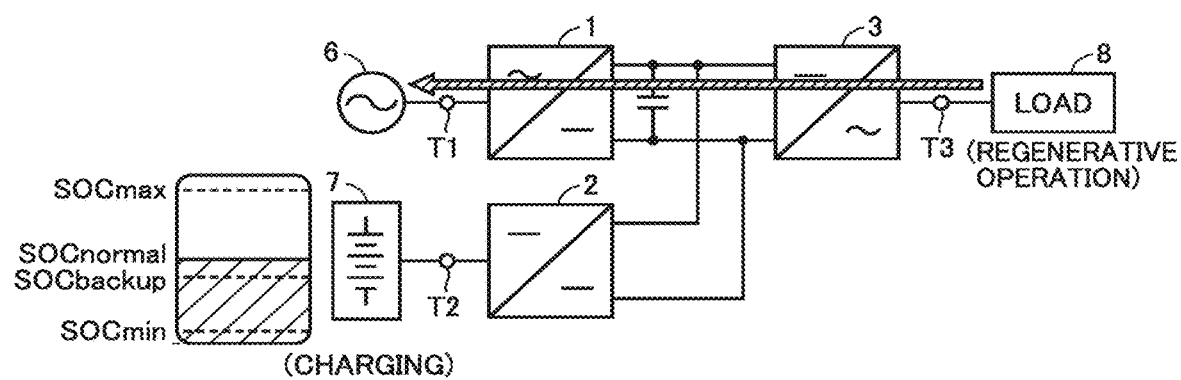
FIG. 6 is a diagram for illustrating an operation of the uninterruptible power supply device that is performed when the commercial AC power supply is sound and the load performs a regenerative operation.

FIG. 6 is a diagram for illustrating the operation of uninterruptible power supply device 100 that is performed when commercial AC power supply 6 is sound and load 8 performs a regenerative operation.

As shown in FIG. 6, inverter 3 converts regenerative power (AC power) generated in load 8 into DC power, and then, outputs the converted DC power between DC lines L1 and L2. Converter 1 converts DC power regenerated from load 8 to DC lines L1 and L2 into AC power, and then, supplies the converted AC power to commercial AC power supply 6. In the example in FIG. 6, since SOC=SOCnormal, the operation of bidirectional chopper 2 is stopped. However, when SOC<SOCnormal, bidirectional chopper 2 can cause the DC power regenerated from load 8 to be stored in battery 7. In this case, control device 5 controls bidirectional chopper 2 such that DC voltage VB of battery 7 reaches reference voltage VBR (=VB1). When reaching a condition SOC>SOCnormal, control device 5 stops the operation of bidirectional chopper 2 to thereby stop charging of battery 7.

Figure 7:
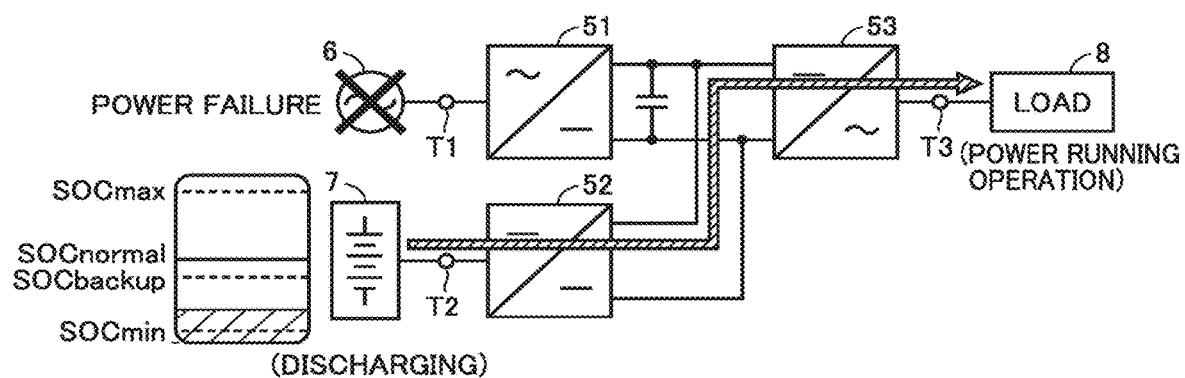
FIG. 7 is a diagram for illustrating an operation of the uninterruptible power supply device that is performed when a power failure occurs in the commercial AC power supply and the load performs a power running operation.

FIG. 7 is a diagram for illustrating the operation of uninterruptible power supply device 100 that is performed when a power failure occurs in commercial AC power supply 6 and load 8 performs a power running operation. When a power failure occurs in commercial AC power supply 6, an electromagnetic contactor (not shown) provided between input terminal T1 and AC terminal 1a of converter 1 is turned off to thereby disconnect commercial AC power supply 6 from uninterruptible power supply device 100. Thus, the operation of converter 1 is stopped.

As shown in FIG. 7, when load 8 is performing a power running operation, bidirectional chopper 2 supplies the DC power of battery 7 to inverter 3 through DC lines L1 and L2. Inverter 3 converts the DC power supplied from battery 7 through DC lines L1 and L2 into AC power, and then, supplies the converted AC power to load 8.

Control device 5 controls bidirectional chopper 2 such that DC voltage VD reaches reference voltage VDR. When the SOC of battery 7 decreases to reach a condition SOC<SOCmin, control device 5 stops the operation of bidirectional chopper 2 to thereby stop discharging of battery 7.

Figure 8:
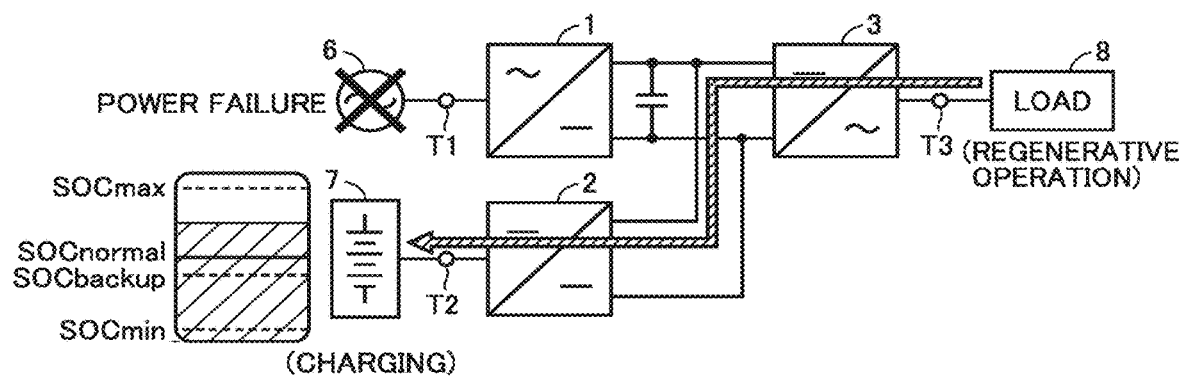
FIG. 8 is a diagram for illustrating an operation of the uninterruptible power supply device that is performed when a power failure occurs in the commercial AC power supply and the load performs a regenerative operation.

FIG. 8 is a diagram for illustrating the operation of uninterruptible power supply device 100 that is performed when a power failure occurs in commercial AC power supply 6 and load 8 performs a regenerative operation. As in FIG. 7, uninterruptible power supply device 100 is disconnected from commercial AC power supply 6, and thus, the operation of converter 1 is stopped.

As shown in FIG. 8, inverter 3 converts regenerative power (AC power) generated in load 8 into DC power and outputs the converted DC power between DC lines L1 and L2. Bidirectional chopper 2 causes the DC power regenerated from load 8 to DC lines L1 and L2 to be stored in battery 7. Control device 5 controls bidirectional chopper 2 such that DC voltage VB of battery 7 reaches reference voltage VBR (=VB2). Thus, battery 7 is charged until the SOC of battery 7 reaches SOCmax. When reaching a condition SOC>SOCmax, control device 5 stops the operation of bidirectional chopper 2 to thereby stop charging of battery 7.

Figure 9:
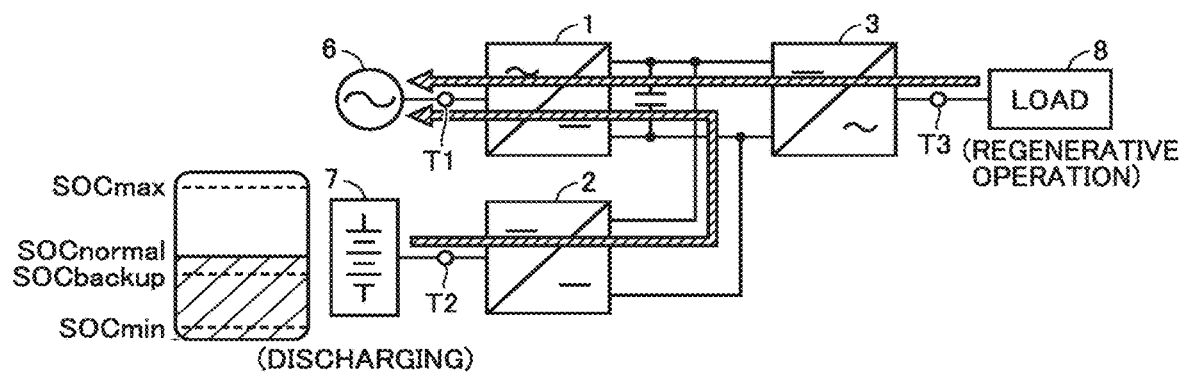
FIG. 9 is a diagram for illustrating an operation of the uninterruptible power supply device that is performed when the commercial AC power supply recovers and the load performs a regenerative operation.

FIG. 9 is a diagram for illustrating the operation of uninterruptible power supply device 100 that is performed when commercial AC power supply 6 recovers and load 8 performs a regenerative operation. By storing the regenerative power generated by load 8 in battery 7 during a power failure of commercial AC power supply 6 as shown in FIG. 8, the condition SOC>SOCnormal may be satisfied when commercial AC power supply 6 recovers. In such a case, as shown in FIG. 9, bidirectional chopper 2 outputs the DC power of battery 7 between DC lines L1 and L2 during the regenerative operation of load 8, and thereby, can lowers the SOC to SOCnormal. Converter 1 converts the DC power supplied from inverter 3 and battery 7 to DC lines L1 and L2 into AC power, and then, supplies the converted AC power to commercial AC power supply 6. Thereby, the regenerative power can be effectively utilized.

Control device 5 controls bidirectional chopper 2 such that DC voltage VD reaches reference voltage VDR. When the SOC of battery 7 decreases to reach a condition SOC≤SOCmin, control device 5 stops the operation of bidirectional chopper 2 to thereby stop discharging of battery 7.

Figure 10:
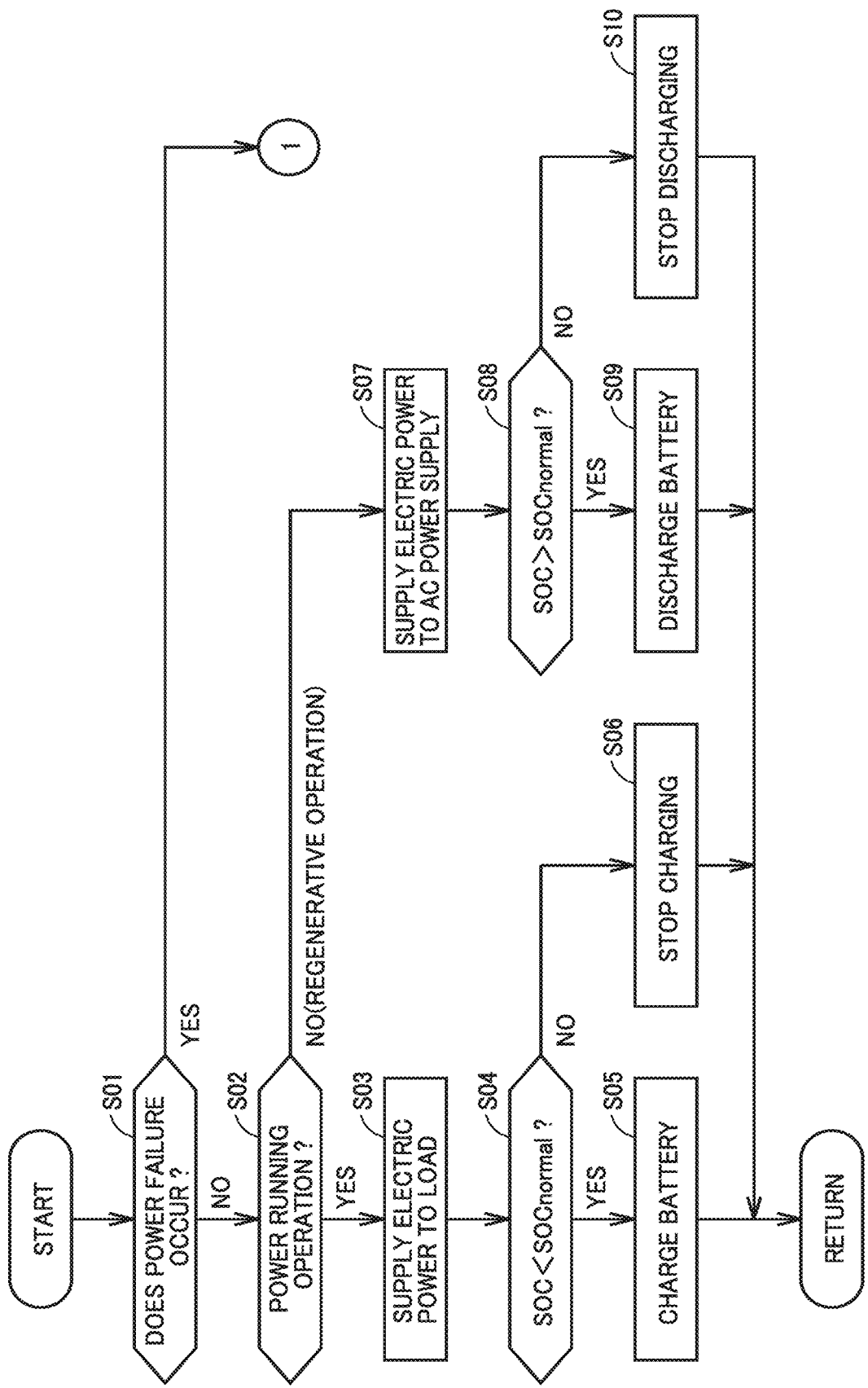
FIG. 10 is a flowchart for illustrating control of the bidirectional chopper by the control device.
Figure 11:
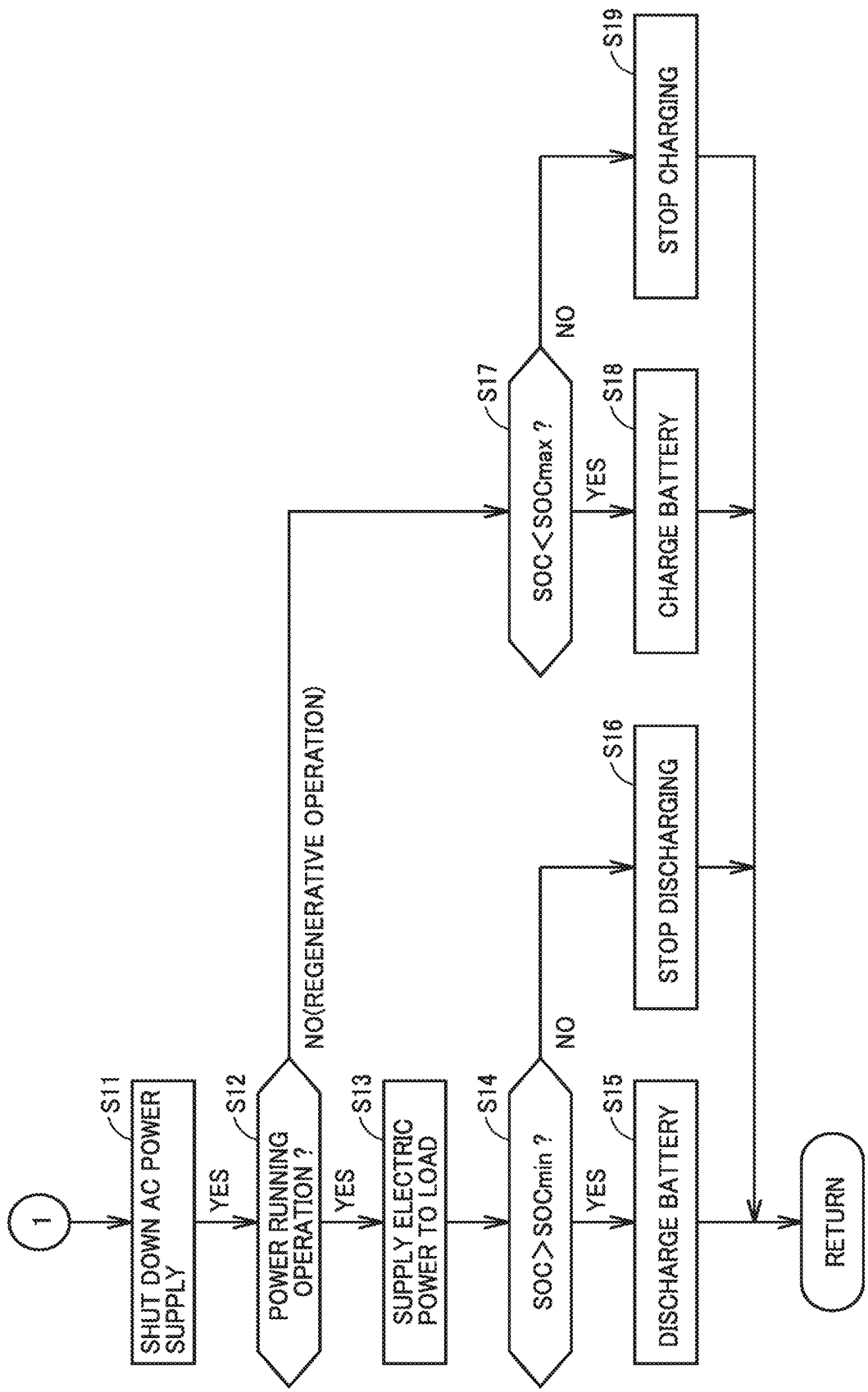
FIG. 11 is a flowchart for illustrating control of the bidirectional chopper by the control device.

FIGS. 10 and 11 each are a flowchart for illustrating control of bidirectional chopper 2 by control device 5. The flowchart in each of FIGS. 10 and 11 is repeatedly executed by control device 5 when uninterruptible power supply device 100 operates.

As shown in FIG. 10, in step (hereinafter simply abbreviated to as "S") 01, based on the detected value of AC voltage VI, control device 5 determines whether or not a power failure occurs in commercial AC power supply 6. When AC voltage VI is within a normal range, the determination is NO in S01. When AC input voltage VI is lower than the normal range, the determination is YES in S01.

When commercial AC power supply 6 is sound (determined as NO in S01), control device 5 proceeds the process to S02, and determines based on the detected value of AC current Io detected by current detector CD3 whether load 8 is performing a power running operation or a regenerative operation. When the active current obtained from AC current Io is a positive value, the determination is YES in S02. When the active current is a negative value, the determination is NO in S02.

When load 8 is performing a power running operation (determined as YES in S02), then in S03, control device 5 controls converter 1 and inverter 3 such that the AC power supplied from commercial AC power supply 6 is supplied to load 8 (see FIG. 5).

During the power running operation of load 8, control device 5 compares the SOC of battery 7 with SOCnormal in S04. When SOC≤SOCnormal (determined as YES in S04), control device 5 proceeds the process to S05 and controls bidirectional chopper 2 to cause the DC power supplied from converter 1 through DC lines L1 and L2 to be stored in battery 7. In S05, control device 5 sets reference voltage VBR at VB1, and controls bidirectional chopper 2 such that DC voltage VB reaches reference voltage VBR. When SOC>SOCnormal (determined as NO in S04), then in S06, control device 5 stops the operation of bidirectional chopper 2 to thereby stop charging of battery 7.

Referring back to S02, when load 8 is performing a regenerative operation (determined as NO in S02), then in S07, control device 5 controls converter 1 and inverter 3 such that the regenerative power generated by load 8 is supplied to commercial AC power supply 6 (see FIG. 6).

During the regenerative operation of load 8, control device 5 compares the SOC of battery 7 with SOCnormal in S08. When SOC>SOCnormal (determined as YES in S08), control device 5 proceeds the process to S09 and controls bidirectional chopper 2 to output the DC power of battery 7 to DC lines L1 and L2 (see FIG. 9). In S09, control device 5 controls bidirectional chopper 2 such that DC voltage VD reaches reference voltage VDR. When SOC≤SOCnormal (determined as NO in S08), then in S10, control device 5 stops the operation of bidirectional chopper 2 to thereby stop discharging of battery 7.

Referring back to S01, when a power failure occurs in commercial AC power supply 6 (determined as YES in S01), control device 5 proceeds the process to S11, and then, turns off the electromagnetic contactor provided between input terminal T1 and AC terminal 1a of converter 1 to thereby disconnect uninterruptible power supply device 100 from commercial AC power supply 6.

Then, control device 5 proceeds the process to S12, and determines based on the detected value of AC current Io detected by current detector CD3 whether load 8 is performing a power running operation or a regenerative operation.

When load 8 is performing a power running operation (determined as YES in S12), then in S13, control device 5 controls bidirectional chopper 2 and inverter 3 such that the DC power of battery 7 is supplied to load 8 (see FIG. 7).

During the power running operation of load 8, control device 5 compares the SOC of battery 7 with SOCmin in S14. When SOC>SOCmin (determined as YES in S14), control device 5 proceeds the process to S15 and controls bidirectional chopper 2 to output the DC power of battery 7 to DC lines L1 and L2. In S15, control device 5 controls bidirectional chopper 2 such that DC voltage VD reaches reference voltage VDR. When SOC≤SOCmin (determined as NO in S14), then in S16, control device 5 stops the operation of bidirectional chopper 2 to thereby stop discharging of battery 7.

Referring back to S12, when load 8 is performing a regenerative operation (determined as NO in S12), control device 5 compares the SOC of battery 7 with SOCmax in S17. When SOC<SOCmax (determined as YES in S17), control device 5 proceeds the process to S18 and controls bidirectional chopper 2 to cause the DC power regenerated from inverter 3 through DC lines L1 and L2 to be stored in battery 7 (see FIG. 8). In S17, control device 5 sets reference voltage VBR at VB2, and controls bidirectional chopper 2 such that DC voltage VB reaches reference voltage VBR. When SOC≥SOCmax (determined as NO in S17), then in S19, control device 5 stops the operation of bidirectional chopper 2 to thereby stop charging of battery 7.

As described above, in uninterruptible power supply device 100 according to the present embodiment, when commercial AC power supply 6 is sound, bidirectional chopper 2 is controlled such that the SOC of battery 7 reaches SOCnormal (a SOC reference value) that is smaller than upper limit value SOCmax of the usable range of the SOC and larger than lower limit value SOCmin of this usable range. Thereby, when load 8 performs a regenerative operation during a power failure of commercial AC power supply 6, battery 7 can recover the regenerative power generated by load 8 via bidirectional chopper 2.

Thereby, an increase in DC voltage VD can be suppressed without returning the regenerative power to commercial AC power supply 6. Further, when the operation of load 8 is switched from the regenerative operation to the power running operation, the regenerative power stored in battery 7 can be supplied to load 8, and thereby, the regenerative power of load 8 can be effectively utilized. Further, when commercial AC power supply 6 is sound, battery 7 is not charged to upper limit value SOCmax of the usable range of the SOC, and therefore, progress of deterioration of battery 7 can be suppressed. Accordingly, the life of battery 7 can be extended.

Further, in the above-described configuration, by setting SOCnormal to be equal to or higher than SOCbackup based on the amount of power storage for power failure compensation, load 8 can be driven for a predetermined compensation time period with the DC power stored in battery 7 when load 8 performs a power running operation during a power failure of commercial AC power supply 6.

Further, SOCnormal is set so as to satisfy the relation SOCnormal+Wmax (the maximum value of the amount of regenerative power)≤SOCmax, which makes it possible to avoid that charging of battery 7 is prohibited as the SOC of battery 7 exceeds SOCmax by the regenerative power when load 8 performs only a regenerative operation during a power failure of commercial AC power supply 6. This makes it possible to suppress an increase in DC voltage VD resulting from a failure of recovery of regenerative power.

In PTL 1, a lithium ion battery for recovering regenerative power is used separately from a storage battery for power failure compensation, which requires two batteries and two bidirectional choppers, with the result that the uninterruptible power supply device is increased in size, weight, and cost. Further, there is a concern that control of the uninterruptible power supply device may become complicated. In the present embodiment, one battery 7 can implement power failure compensation and recovery of regenerative power, so that the above-mentioned concern can be resolved.

It should be understood that the embodiments disclosed herein are illustrative and non-restrictive in every respect.

The technical scope of the present disclosure is defined by the terms of the claims, rather than the description above, and is intended to include any modifications within the meaning and scope equivalent to the terms of the claims.

REFERENCE SIGNS LIST

1 converter, 2 bidirectional chopper, 3 inverter, 4 operation unit, 5 control device, 6 commercial AC power supply, 7 battery, 8 load, 10 CPU, 12 memory, 14 I/O circuit, 16 bus, 20 SOC calculation unit, 22 power failure detector, 24 charging controller, 26 discharging controller, 28 load determination unit, 30 controller, 100 uninterruptible power supply device, C1 capacitor, CD1 to CD3 current detector, L1, L2 DC line.

The invention claimed is:

1. An uninterruptible power supply device connected between an AC power supply and a load, the uninterruptible power supply device comprising:
 a converter that converts AC power from the AC power supply into DC power and outputs the DC power to a DC bus;
 a bidirectional chopper that selectively performs
  a charging operation to store the DC power received from the DC bus in a power storage device, and
  a discharging operation to output the DC power in the power storage device to the DC bus;
 an inverter that converts the DC power received from the DC bus into AC power and supplies the AC power to the load, and converts regenerative power generated by the load into DC power and outputs the DC power to the DC bus; and
 a control device that controls the bidirectional chopper based on an SOC of the power storage device, wherein
 an SOC reference value is set for the power storage device, the SOC reference value being smaller than an upper limit value of a usable range of the SOC and larger than a lower limit value of the usable range,
 when the AC power supply is sound, the control device controls the bidirectional chopper such that the SOC of the power storage device reaches the SOC reference value, and
 when a power failure occurs in the AC power supply, based on the usable range, the control device controls the discharging operation in response to a power running operation of the load and controls the charging operation in response to a regenerative operation of the load,
 wherein
 when the AC power supply is sound, the converter converts DC power received from the DC bus in response to the regenerative operation of the load into AC power and supplies the AC power to the AC power supply, and
 when the SOC of the power storage device is larger than the SOC reference value, the control device controls the discharging operation such that the SOC of the power storage device reaches the SOC reference value in response to the regenerative operation of the load.

2. The uninterruptible power supply device according to claim 1, wherein the SOC reference value is set to be equal to or larger than an SOC required for supplying electric power from the power storage device to the load until a predetermined compensation time period has elapsed since the power failure occurs in the AC power supply.

3. The uninterruptible power supply device according to claim 2, wherein the SOC reference value is set such that a value obtained by adding a maximum value of an amount of regenerative power generated by the load to the SOC reference value is equal to or smaller than the upper limit value.

4. The uninterruptible power supply device according to claim 1, wherein
 when the AC power supply is sound, the control device stops the charging operation when the SOC of the power storage device exceeds the SOC reference value, and
 when the power failure occurs in the AC power supply, the control device stops the charging operation when the SOC of the power storage device exceeds the upper limit value.

5. The uninterruptible power supply device according to claim 1, wherein
 when the AC power supply is sound, the control device stops the discharging operation when the SOC of the power storage device becomes smaller than the SOC reference value, and
 when the power failure occurs in the AC power supply, the control device stops the discharging operation when the SOC of the power storage device becomes smaller than the lower limit value.

6. The uninterruptible power supply device according to claim 1, wherein the power storage device is a lithium ion battery.

7. The uninterruptible power supply device according to claim 2, wherein
 when the AC power supply is sound, the converter converts DC power received from the DC bus in response to the regenerative operation of the load into AC power and supplies the AC power to the AC power supply, and
 when the SOC of the power storage device is larger than the SOC reference value, the control device controls the discharging operation such that the SOC of the power storage device reaches the SOC reference value in response to the regenerative operation of the load.

8. The uninterruptible power supply device according to claim 2, wherein
 when the AC power supply is sound, the control device stops the charging operation when the SOC of the power storage device exceeds the SOC reference value, and
 when the power failure occurs in the AC power supply, the control device stops the charging operation when the SOC of the power storage device exceeds the upper limit value.

9. The uninterruptible power supply device according to claim 2, wherein
 when the AC power supply is sound, the control device stops the discharging operation when the SOC of the power storage device becomes smaller than the SOC reference value, and
 when the power failure occurs in the AC power supply, the control device stops the discharging operation when the SOC of the power storage device becomes smaller than the lower limit value.

10. The uninterruptible power supply device according to claim 3, wherein
 when the AC power supply is sound, the converter converts DC power received from the DC bus in response to the regenerative operation of the load into AC power and supplies the AC power to the AC power supply, and
 when the SOC of the power storage device is larger than the SOC reference value, the control device controls the discharging operation such that the SOC of the power storage device reaches the SOC reference value in response to the regenerative operation of the load.

11. The uninterruptible power supply device according to claim 3, wherein when the AC power supply is sound, the control device stops the charging operation when the SOC of the power storage device exceeds the SOC reference value, and when the power failure occurs in the AC power supply, the control device stops the charging operation when the SOC of the power storage device exceeds the upper limit value.

12. The uninterruptible power supply device according to claim 3, wherein when the AC power supply is sound, the control device stops the discharging operation when the SOC of the power storage device becomes smaller than the SOC reference value, and when the power failure occurs in the AC power supply, the control device stops the discharging operation when the SOC of the power storage device becomes smaller than the lower limit value.

* * * * *